(12) United States Patent
Singh et al.

(10) Patent No.: US 11,661,838 B2
(45) Date of Patent: May 30, 2023

(54) USING ACTIVE ACTUATION FOR DOWNHOLE FLUID IDENTIFICATION AND CEMENT BARRIER QUALITY ASSESSMENT

(71) Applicant: HALLIBURTON ENERGY SERVICES, INC., Houston, TX (US)

(72) Inventors: John Paul Bir Singh, Kingwood, TX (US); Mikko Jaaskelainen, Houston, TX (US); John L. Maida, Houston, TX (US); Krishna Babu Yerubandi, Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 132 days.

(21) Appl. No.: 17/039,553

(22) Filed: Sep. 30, 2020

(65) Prior Publication Data
US 2021/0238978 A1 Aug. 5, 2021

Related U.S. Application Data

(60) Provisional application No. 62/969,027, filed on Feb. 1, 2020, provisional application No. 62/968,989, filed
(Continued)

(51) Int. Cl.
*E21B 47/005* (2012.01)
*G01V 1/40* (2006.01)
(Continued)

(52) U.S. Cl.
CPC .......... *E21B 47/005* (2020.05); *E21B 47/06* (2013.01); *E21B 47/07* (2020.05); *G01V 1/40* (2013.01); *G01V 1/52* (2013.01); *E21B 33/14* (2013.01)

(58) Field of Classification Search
CPC ........ E21B 47/005; E21B 47/06; E21B 47/07; E21B 33/14; E21B 47/135; G01V 1/40; G01V 1/52; G01V 1/226
See application file for complete search history.

(56) References Cited

U.S. PATENT DOCUMENTS

| | | |
|---|---|---|
| 2,838,116 A | 6/1958 | Clark, Jr. et al. |
| 3,250,330 A | 5/1966 | Smith, Jr. |

(Continued)

FOREIGN PATENT DOCUMENTS

| | | | |
|---|---|---|---|
| CA | 3024467 A1 * | 5/2019 | ............. E21B 33/13 |
| EP | 2646647 B1 | 10/2014 | |

(Continued)

OTHER PUBLICATIONS

WO-2017095447-A1 Translated (Year: 2017).*
(Continued)

*Primary Examiner* — Natalie Huls
*Assistant Examiner* — Michael J Singletary
(74) *Attorney, Agent, or Firm* — Novak Druce Carroll LLP

(57) ABSTRACT

Aspects of the subject technology relate to systems and methods for determining cement barrier quality of a cementing process. Systems and methods are provided for receiving data from a distributed acoustic sensing fiber optic line positioned proximate to cement barrier of a wellbore, determining at least one zonal isolation in the cement barrier based on the data received from the distributed acoustic sensing fiber optic line, and compiling a cement bond log based on the determining of the at least one zonal isolation in the cement barrier.

20 Claims, 9 Drawing Sheets

Related U.S. Application Data on Jan. 31, 2020, provisional application No. 62/968,995, filed on Jan. 31, 2020.

(51) Int. Cl.
| | | |
|---|---|---|
| *E21B 47/06* | (2012.01) | |
| *E21B 47/07* | (2012.01) | |
| *G01V 1/52* | (2006.01) | |
| *E21B 33/14* | (2006.01) | |

(56) References Cited

U.S. PATENT DOCUMENTS

| | | | |
|---|---|---|---|
| RE27,459 E | 8/1972 | Guinn et al. | |
| 4,832,121 A | 5/1989 | Anderson | |
| 5,275,038 A | 1/1994 | Sizer et al. | |
| 5,375,661 A | 12/1994 | Daneshy et al. | |
| 5,892,176 A | 4/1999 | Findlay et al. | |
| 5,996,689 A | 12/1999 | Head | |
| 6,268,911 B1 | 7/2001 | Tubel et al. | |
| 6,367,548 B1 | 4/2002 | Purvis et al. | |
| 6,531,694 B2 | 3/2003 | Tubel et al. | |
| 6,532,839 B1 | 3/2003 | Kluth et al. | |
| 7,055,604 B2 | 6/2006 | Jee et al. | |
| 7,448,448 B2 | 11/2008 | Lovell et al. | |
| 7,617,873 B2 | 11/2009 | Lovell et al. | |
| 9,388,685 B2 | 7/2016 | Ravi et al. | |
| 9,546,548 B2 * | 1/2017 | Hartog | G01V 1/44 |
| 9,708,867 B2 | 7/2017 | Lovell et al. | |
| 2002/0007945 A1 | 1/2002 | Neuroth et al. | |
| 2012/0132417 A1 * | 5/2012 | Dria | E21B 47/07 166/250.01 |
| 2021/0238980 A1 * | 8/2021 | Vargo, Jr. | E21B 47/135 |
| 2022/0010668 A1 * | 1/2022 | Vargo, Jr | E21B 47/005 |
| 2022/0011464 A1 * | 1/2022 | Alali | G01N 33/383 |

FOREIGN PATENT DOCUMENTS

| | | | | |
|---|---|---|---|---|
| GB | 2328968 | A | 3/1999 | |
| WO | 2002057805 | A2 | 7/2002 | |
| WO | 2004018840 | A1 | 3/2004 | |
| WO | 2015004487 | A2 | 1/2015 | |
| WO | WO-2017095447 | A1 * | 6/2017 | ......... E21B 47/0005 |
| WO | 2019132860 | A1 | 7/2019 | |

OTHER PUBLICATIONS

CA-3024467-A1 (Year: 2019).*
International Search Report, Response & Written Opinion, PCT Application No. PCT/US2020/05384, dated Jan. 20, 2021.
Johnson, D.O., et al., Society of Petroleum Engineers (SPE) Paper # 77460, "Identification of Steam Breakthrough Intervals Using DTS Technology," Sep. 2002.
Fryer, V., et al., Society of Petroleum Engineers (SPE) Paper # 92962, "Monitoring of Real-Time Temperature Profiles Across Multizone Reservoirs During Production and Shut-In Periods Using Permanent Fiber-Optic Distributed Temperature Systems," Apr. 2005.
Economides, M.J., "a practical companion to reservoir stimulation," Developments in Petroleum Science, vol. 34, 1992.
Economides, M.J. et al., "Reservoir Stimulation," Second Edition, 1989.
Smith, Robert, et al., Society of Petroleum Engineers (SPE) Paper # 2686, "Computer Study of Factors Affecting Temperature Profiles in Water Injection Wells," Journal of Petroleum Engineering, p. 1447, Nov. 1970.
Rajah, Benny, et al., Society of Petroleum Engineers (SPE) Paper #29290, "Experiences and Results of Acid Prepacking and Gravelpacking Wells in the West Luton Field in Sarawak, Malaysia," Mar. 1995.
Wehunt, Jr., C.D., Society of Petroleum Engineers (SPE) Paper# 20137, "Evaluation of Alternating Phase Fracture Acidizing Treatment Using Measured Bottomhole Pressure," Mar. 1990.
Nelson, R.L., et al., Society of Petroleum Engineers (SPE) Paper# 39943, "Multiple Pad-Acid Fracs in a Deep Horizontal Well," Apr. 1998.
Krawietz, T.E., et al., Society of Petroleum Engineers (SPE) Paper # 27809, "Horizontal Well Acidizing of a Carbonate Formation: A Case History of Lisbume Treatments, Prudhoe Bay, Alaska," Nov. 1996.

* cited by examiner

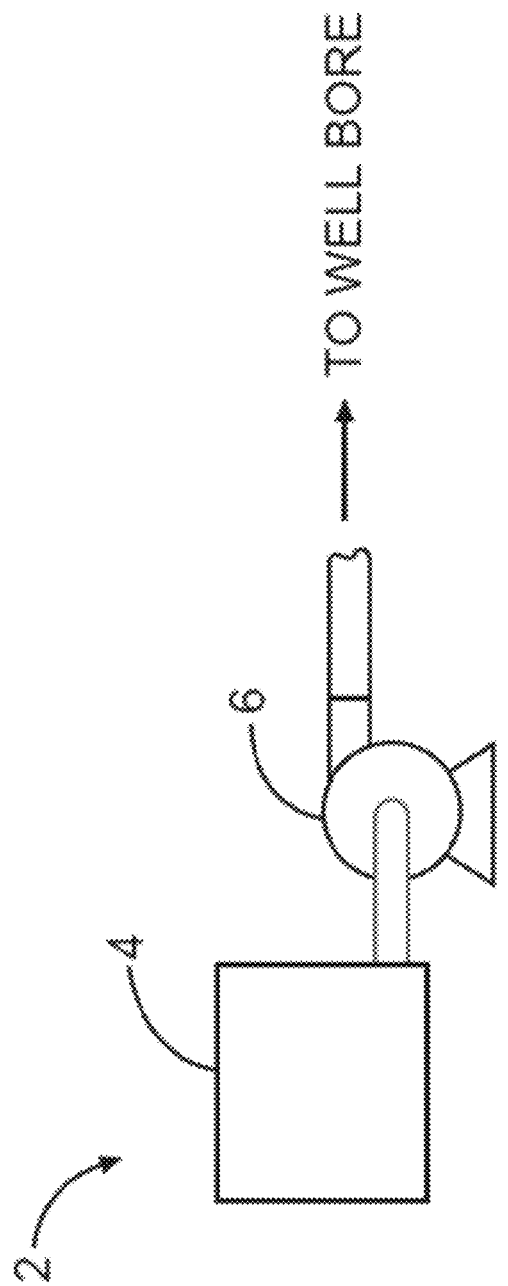

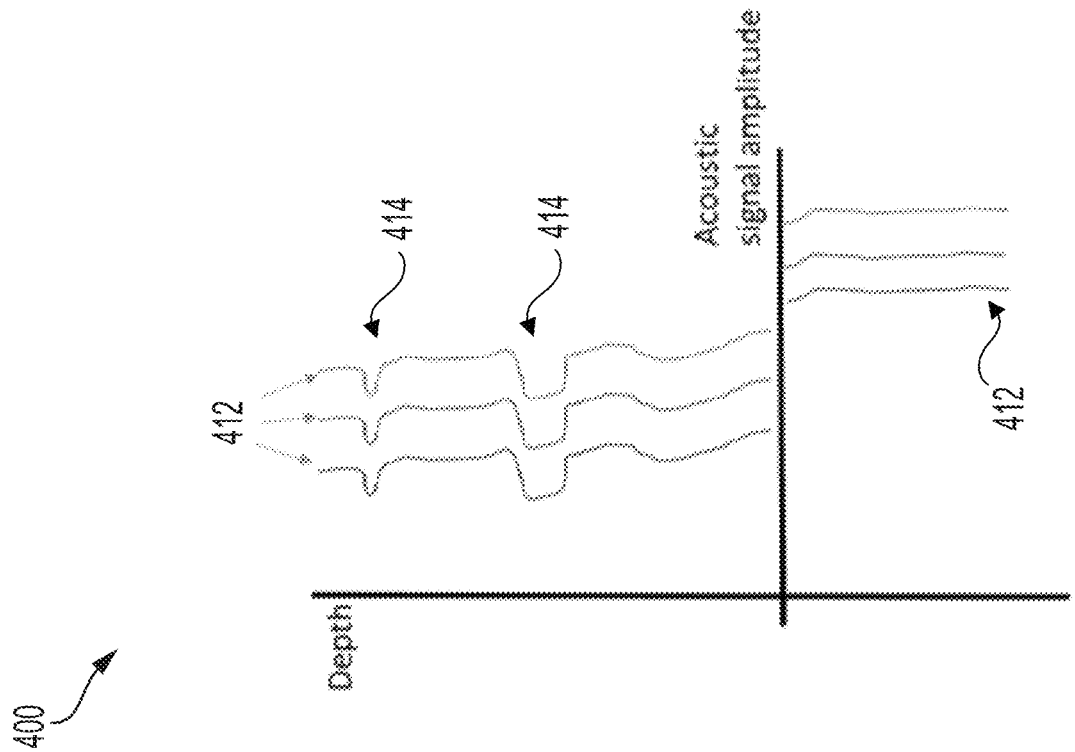
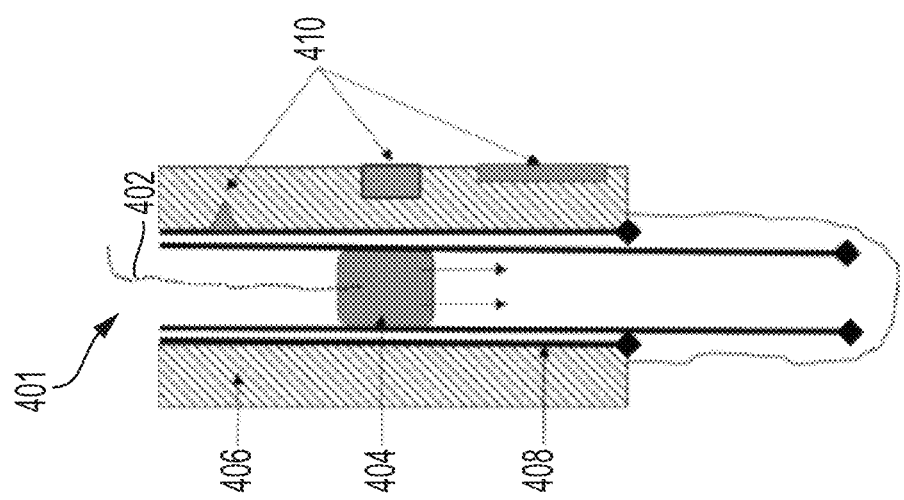
FIG. 4B
FIG. 4A

USING ACTIVE ACTUATION FOR DOWNHOLE FLUID IDENTIFICATION AND CEMENT BARRIER QUALITY ASSESSMENT

CROSS-REFERENCE TO RELATED APPLICATIONS

This application claims priority to U.S. Provisional Patent Application Nos. 62/968,989, filed on Jan. 31, 2020, entitled "DOWNHOLE FLUID IDENTIFICATION AND CEMENT BARRIER QUALITY ASSESSMENT THROUGH ACTIVE ACTUATION;" 62/968,995, filed on Jan. 31, 2020, entitled "PLUG-BOBBIN DEPLOYED DISTRIBUTED ACOUSTIC SENSING FIBER FOR CEMENT BOND LOG;" and 62/969,027, filed Feb. 1, 2020, entitled "PASSIVELY MONITORING CEMENT UNDER DOWNHOLE CONDITIONS," the contents of which are incorporated herein by reference in their entirety.

TECHNICAL FIELD

The present technology pertains to a cementing process, and more particularly, to determining cement barrier quality of the cementing process.

BACKGROUND

During a cementing process, cement is pumped and poured into position, and thereafter, the quality of a cement barrier is determined. A cement bond log is a measure of quality of zonal isolations achieved through the cementing process. However, due to the additional expense of conducting this operation, actual measurement of the quality of zonal isolations is rarely conducted. Moreover, the cost of the additional service, the added time required for cement logging, and coordination with a third party for cement logging are all factors that play a role in determining whether an operator obtains a cement bond log.

As such, a need exists for obtaining cement bond logs that do not involve a third party or a special operation, and that are relatively inexpensive.

BRIEF DESCRIPTION OF THE DRAWINGS

In order to describe the manner in which the features and advantages of this disclosure can be obtained, a more particular description is provided with reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 1 illustrates a system for preparation and delivery of a cement composition to a well bore in accordance with aspects of the present disclosure.

FIGS. 4A and 4B illustrate an example schematic of a wellbore with a plug driven fiber optic line deployed within an inside casing in accordance with aspects of the present disclosure.

DETAILED DESCRIPTION

Figure 2A:
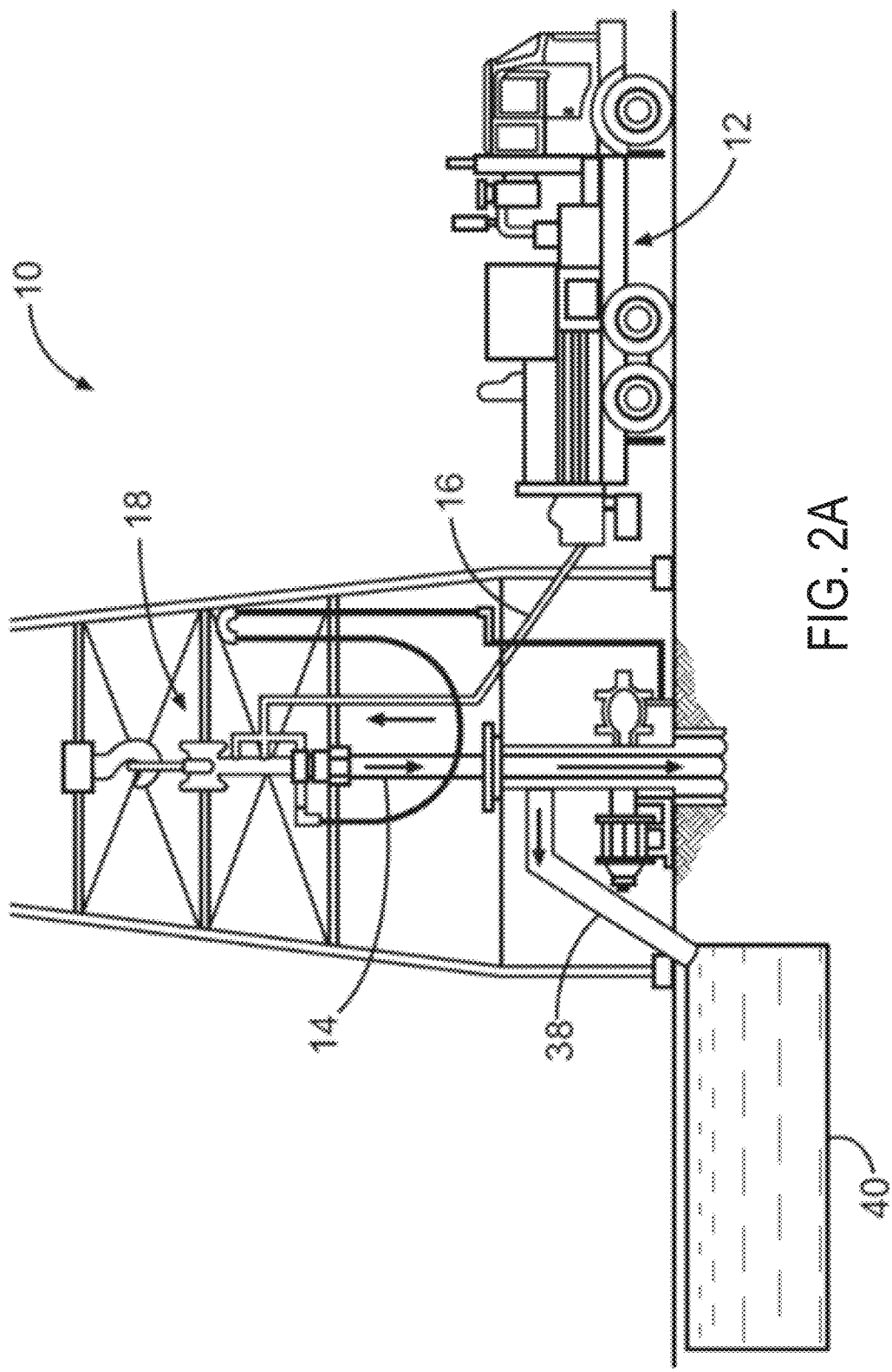
FIG. 2A illustrates surface equipment that may be used in placement of a cement composition in a well bore in accordance with aspects of the present disclosure.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Additional features and advantages of the disclosure will be set forth in the description which follows, and in part will be obvious from the description, or can be learned by practice of the principles disclosed herein. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Subterranean hydraulic fracturing is conducted to increase or "stimulate" production from a hydrocarbon well. To conduct a fracturing process, pressure is used to pump special fracturing fluids, including some that contain propping agents ("proppants"), down-hole and into a hydrocarbon formation to split or "fracture" the rock formation along veins or planes extending from the well-bore. Once the desired fracture is formed, the fluid flow is reversed and the liquid portion of the fracturing fluid is removed. The proppants are intentionally left behind to stop the fracture from closing onto itself due to the weight and stresses within the formation. The proppants thus literally "prop-apart", or support the fracture to stay open, yet remain highly permeable to hydrocarbon fluid flow since they form a packed bed of particles with interstitial void space connectivity. Sand is one example of a commonly-used proppant. The newly-created-and-propped fracture or fractures can thus serve as new formation drainage area and new flow conduits from the formation to the well, providing for an increased fluid flow rate, and hence increased production of hydrocarbons.

To begin a fracturing process, at least one perforation is made at a particular down-hole location through the well into a subterranean formation, e.g. through a wall of the well casing, to provide access to the formation for the fracturing fluid. The direction of the perforation attempts to determine at least the initial direction of the fracture.

A first "mini-fracture" test can be conducted in which a relatively small amount of proppant-free fracturing fluid is pumped into the formation to determine and/or confirm at least some of the properties of the formation, such as the permeability of the formation itself. Accurately knowing the permeability allows for a prediction of the fluid leak-off rate at various pressures, whereby the amount of fracturing fluid that will flow into the formation can be considered in establishing a pumping and proppant schedule. Thus, the total amount of fluid to be pumped down-hole is at least the sum of the cased volume of the well, the amount of fluid that fills the fracture, and the amount of fluid that leaks-off into the formation during the fracturing process itself. Leak-off rate is an important parameter because once proppant-laden fluid is pumped into the fracture, leak-off can increase the concentration of the proppant in the fracturing fluid beyond a target level. Data from the mini-fracture test then is usually used by experts to confirm or modify the original desired target profile of the fracture and the completion process used to achieve the fracture.

Fracturing then begins in earnest by first pumping proppant-free fluid into the wellbore or through tubing. The fracture is initiated and begins to grow in height, length, and/or width. This first proppant-free stage is usually called the "pre-pad" and consists of a low viscosity fluid. A second fluid pumping stage is usually then conducted of a different viscosity proppant-free fluid called the "pad." At a particular time in the pumping process, the proppant is then added to a fracturing and propping flow stream using a continuous blending process, and is usually gradually stepped-up in proppant concentration. The resultant fractures are then filled or partly filled with proppant to stabilize the fractures.

This process can be repeated in a plurality of fracturing stages to form a plurality of fractures through a wellbore, e.g. as part of a well completion phase. In particular and as will be discussed in greater detail later, this process can be repeatedly performed through a plug-and-perf technique to form the fractures throughout a subterranean formation. After the fractures are formed, resources, e.g. hydrocarbons, can be extracted from the fractures during a well production phase.

The binder compositions disclosed herein may directly or indirectly affect one or more components or pieces of equipment associated with the preparation, delivery, recapture, recycling, reuse, and/or disposal of the disclosed binder compositions. For example, the disclosed binder compositions may directly or indirectly affect one or more mixers, related mixing equipment, mud pits, storage facilities or units, composition separators, heat exchangers, sensors, gauges, pumps, compressors, and the like used generate, store, monitor, regulate, and/or recondition the exemplary binder compositions. The disclosed binder compositions may also directly or indirectly affect any transport or delivery equipment used to convey the binder compositions to a well site or downhole such as, for example, any transport vessels, conduits, pipelines, trucks, tubulars, and/or pipes used to compositionally move the binder compositions from one location to another, any pumps, compressors, or motors (e.g., topside or downhole) used to drive the binder compositions into motion, any valves or related joints used to regulate the pressure or flow rate of the binder compositions, and any sensors (i.e., pressure and temperature), gauges, and/or combinations thereof, and the like. The disclosed binder compositions may also directly or indirectly affect the various downhole equipment and tools that may come into contact with the cement compositions/additives such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

The disclosed technology addresses the foregoing by determining cement barrier quality of a cementing process. In turn, cement barrier quality can be determined based on data received from sensors distributed proximate to the cement barrier.

In various embodiments, a method for determining cement barrier quality of a cementing process can include receiving data from a distributed acoustic sensing fiber optic line positioned proximate to cement barrier of a wellbore. The method can further include determining at least one zonal isolation in the cement barrier based on the data received from the distributed acoustic sensing fiber optic line. The method can also include compiling a cement bond log based on the determining of the at least one zonal isolation in the cement barrier.

In various embodiments, a system for determining cement barrier quality of a cementing process can include one or more processors; and at least one computer-readable storage medium having stored therein instructions which, when executed by the one or more processors, cause the system to receive data from a distributed acoustic sensing fiber optic line positioned proximate to cement barrier of a wellbore. The instructions can further cause the system to determine at least one zonal isolation in the cement barrier based on the data received from the distributed acoustic sensing fiber optic line. Furthermore, the instructions can cause the system to compile a cement bond log based on the determination of the at least one zonal isolation in the cement barrier.

In various embodiments, a non-transitory computer-readable storage medium comprising instructions stored on the non-transitory computer-readable storage medium, the instructions, when executed by one or more processors, cause the one or more processors to receive data from a distributed acoustic sensing fiber optic line positioned proximate to cement barrier of a wellbore. The instructions can further cause the one or more processors to determine at least one zonal isolation in the cement barrier based on the data received from the distributed acoustic sensing fiber optic line. Furthermore, the instructions can further cause the one or more processors to compile a cement bond log based on the determination of the at least one zonal isolation in the cement barrier.

During a cementing process, cement is pumped and poured into position, and thereafter, the quality of a cement barrier is determined. For example, the cementing process can include pumping cement through a casing to a toe of a well and then up an annular space. In other instances, the cementing process can include reverse cementing where cement is pumped down through the annular space until the cement hits the bottom of the well. A cement bond log is a measure of quality of zonal isolations achieved through the cementing process. However, due to the additional expense of conducting this operation, actual measurement of the quality of zonal isolations is rarely conducted. Moreover, the cost of the additional service, the added time required for cement logging, and coordination with a third party for cement logging are all factors that play a role in determining whether an operator obtains a cement bond log.

As such, a need exists for obtaining cement bond logs that do not involve a third party or a special operation, and that are relatively inexpensive.

Referring now to FIG. 1, a system that may be used in the preparation of a cement composition in accordance with example embodiments will now be described. FIG. 1 illustrates a system 2 for preparation of a cement composition and delivery to a well bore in accordance with certain embodiments. As shown, the cement composition may be mixed in mixing equipment 4, such as a jet mixer, re-circulating mixer, or a batch mixer, for example, and then pumped via pumping equipment 6 to the well bore. In some embodiments, the mixing equipment 4 and the pumping equipment 6 may be disposed on one or more cement trucks as will be apparent to those of ordinary skill in the art. In some embodiments, a jet mixer may be used, for example, to continuously mix the composition, including water, as it is being pumped to the well bore.

An example technique and system for placing a cement composition into a subterranean formation will now be described with reference to FIGS. 2A and 2B. FIG. 2A illustrates surface equipment 10 that may be used in placement of a cement composition in accordance with certain embodiments. It should be noted that while FIG. 2A generally depicts a land-based operation, those skilled in the art will readily recognize that the principles described herein are equally applicable to subsea operations that employ floating or sea-based platforms and rigs, without departing from the scope of the disclosure. As illustrated by FIG. 2A, the surface equipment 10 may include a cementing unit 12, which may include one or more cement trucks. The cementing unit 12 may include mixing equipment 4 and pumping equipment 6 (e.g., FIG. 1) as will be apparent to those of ordinary skill in the art. The cementing unit 12 may pump a cement composition 14 through a feed pipe 16 and to a cementing head 18 which conveys the cement composition 14 downhole.

Figure 2B:
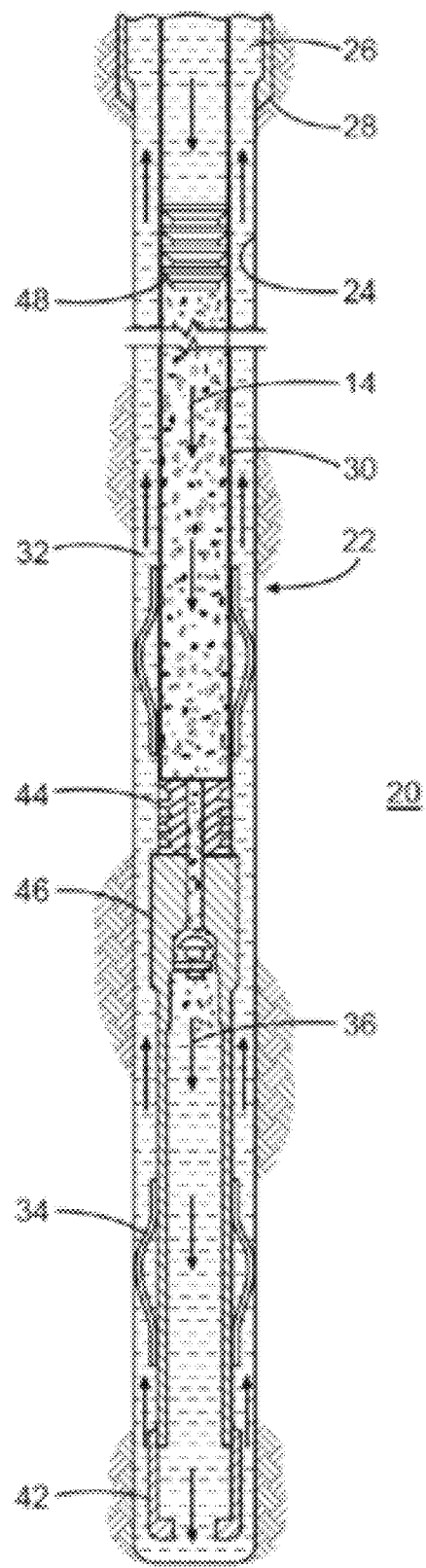
FIG. 2B illustrates placement of a cement composition into a well bore annulus in accordance with aspects of the present disclosure.

Turning now to FIG. 2B, the cement composition 14 may be placed into a subterranean formation 20 in accordance with example embodiments. As illustrated, a well bore 22 may be drilled into the subterranean formation 20. While well bore 22 is shown extending generally vertically into the subterranean formation 20, the principles described herein are also applicable to well bores that extend at an angle through the subterranean formation 20, such as horizontal and slanted well bores. As illustrated, the well bore 22 comprises walls 24. In the illustrated embodiments, a surface casing 26 has been inserted into the well bore 22. The surface casing 26 may be cemented to the walls 24 of the well bore 22 by cement sheath 28. In the illustrated embodiment, one or more additional conduits (e.g., intermediate casing, production casing, liners, etc.) shown here as casing 30 may also be disposed in the well bore 22. As illustrated, there is a well bore annulus 32 formed between the casing 30 and the walls 24 of the well bore 22 and/or the surface casing 26. One or more centralizers 34 may be attached to the casing 30, for example, to centralize the casing 30 in the well bore 22 prior to and during the cementing operation.

With continued reference to FIG. 2B, the cement composition 14 may be pumped down the interior of the casing 30. The cement composition 14 may be allowed to flow down the interior of the casing 30 through the casing shoe 42 at the bottom of the casing 30 and up around the casing 30 into the well bore annulus 32. The cement composition 14 may be allowed to set in the well bore annulus 32, for example, to form a cement sheath that supports and positions the casing 30 in the well bore 22. While not illustrated, other techniques may also be utilized for introduction of the cement composition 14. By way of example, reverse circulation techniques may be used that include introducing the cement composition 14 into the subterranean formation 20 by way of the well bore annulus 32 instead of through the casing 30.

As it is introduced, the cement composition 14 may displace other fluids 36, such as drilling fluids and/or spacer fluids, that may be present in the interior of the casing 30 and/or the well bore annulus 32. At least a portion of the displaced fluids 36 may exit the well bore annulus 32 via a flow line 38 and be deposited, for example, in one or more retention pits 40 (e.g., a mud pit), as shown on FIG. 2A. Referring again to FIG. 2B, a bottom plug 44 may be introduced into the well bore 22 ahead of the cement composition 14, for example, to separate the cement composition 14 from the fluids 36 that may be inside the casing 30 prior to cementing. After the bottom plug 44 reaches the landing collar 46, a diaphragm or other suitable device ruptures to allow the cement composition 14 through the bottom plug 44. In FIG. 2B, the bottom plug 44 is shown on the landing collar 46. In the illustrated embodiment, a top plug 48 may be introduced into the well bore 22 behind the binder composition 14. The top plug 48 may separate the cement composition 14 from a displacement fluid 50 and also push the cement composition 14 through the bottom plug 44.

Figure 3:
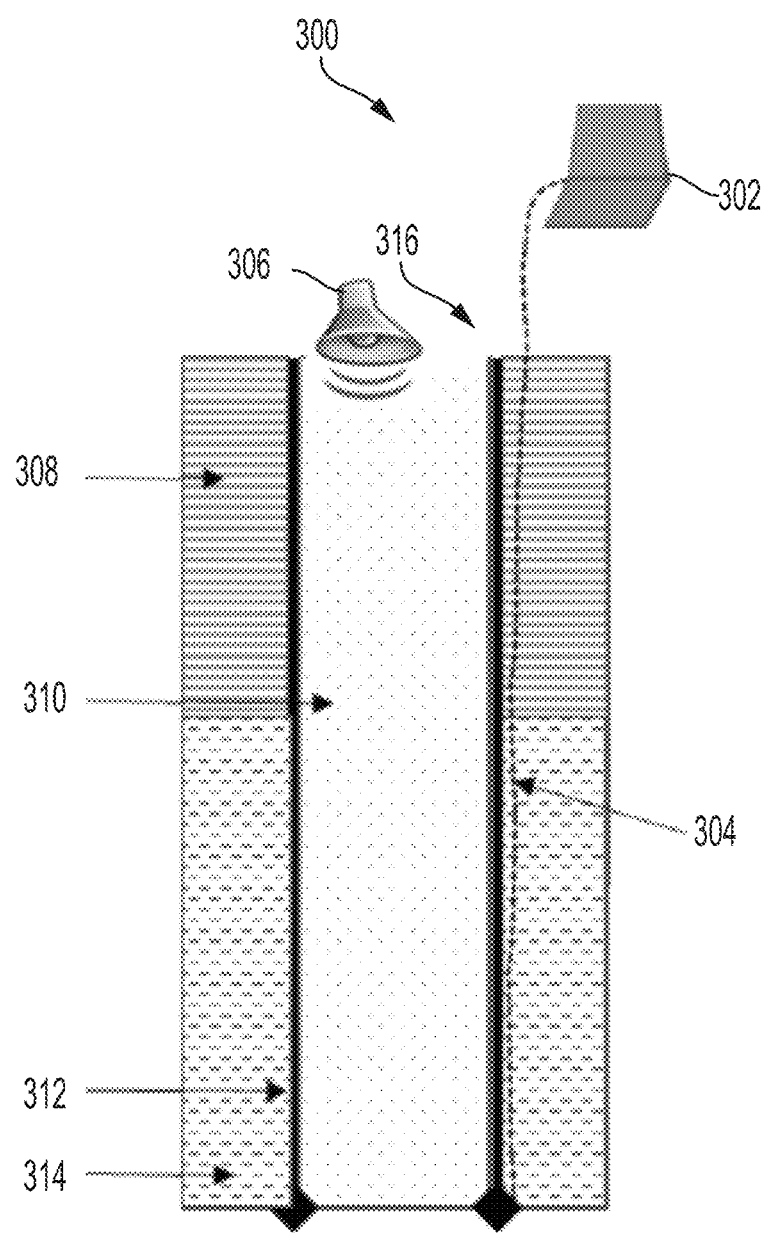
FIG. 3 illustrates an example schematic of a wellbore with an installed distributed acoustic sensing fiber optic line in accordance with aspects of the present disclosure.

FIG. 3 illustrates an example schematic of a wellbore 316 with an installed distributed acoustic sensing fiber optic line system 300 in accordance with aspects of the present disclosure. Fiber optic line system 300 can include a data acquisition system 302, a sensor such as a fiber optic line 304, and/or an acoustic speaker 306. The wellbore 316 can include a spacer 308, completion fluid 310, a casing/liner 312, and/or cement 314.

In some implementations, the sensors of fiber optic line system 300 may be permanently or temporarily installed sensors that may also be used, and the sensors may include fiber optic lines 304 cemented in place in the annular space between casing 312 and formation (e.g., spacer 308 or cement 314). Fiber optic lines 304 may be clamped to the outside of casing 312 during the deployment and protected by centralizers and cross coupling clamps. Other types of sensors may include surface and down-hole pressure sensors, where the pressure sensors may be capable of collecting data at rates up to 2,000 Hz or even higher.

Fiber optic lines 304 may house one or several optical fibers and the optical fibers may be single mode fibers, multi-mode fibers or a combination of single mode and multi-mode optical fibers. The fiber optic sensing systems (e.g., data acquisition system 302) connected to the optical fibers 304 may include Distributed Temperature Sensing (DTS) systems, Distributed Acoustic Sensing (DAS) Systems, Distributed Strain Sensing (DSS) Systems, quasi-distributed sensing systems where multiple single point sensors are distributed along an optical fiber/cable, or single point sensing systems where the sensors are located at the end of the cable.

The fiber optic sensing systems (e.g., data acquisition system 302) may operate using various sensing principles including but not limited to amplitude based sensing systems such as DTS systems based on Raman scattering, phase sensing based systems such as DAS systems based on interferometric sensing using homodyne or heterodyne techniques where the system may sense phase or intensity changes due to constructive or destructive interference based on Rayleigh scattering, strain sensing systems such as DSS using dynamic strain measurements based on interferometric sensors or static strain sensing measurements based on Brillouin scattering, quasi-distributed sensors based on Fiber Bragg Gratings (FBGs) where a wavelength shift is detected or multiple FBGs are used to form Fabry-Perot type interferometric sensors for phase or intensity based sensing, or single point fiber optic sensors based on Fabry-Perot or FBG or intensity based sensors.

Electrical sensors of fiber optic line system 300 may be pressure sensors based on quarts type sensors or strain gauge based sensors or other commonly used sensing technologies. Pressure sensors, optical or electrical, may be housed in dedicated gauge mandrels or attached outside the casing in various configurations for down-hole deployment or deployed conventionally at the surface well head or flow lines.

Various hybrid approaches where single point or quasi-distributed or distributed fiber optic sensors are mixed with electrical sensors are also anticipated. Fiber optic line 304 may further include optical fiber and electrical conductors.

Temperature measurements from a DTS system may be utilize by fiber optic line system 300 to determine locations for fluid inflow in a treatment well as the fluids from the surface are likely to be cooler than formation temperatures. DTS warm-back analyses can be utilized to determine fluid volume placement, which can be done for water injection wells and the same technique can be used for fracturing fluid placement. Temperature measurements in observation wells can be utilized to determine fluid communication between the treatment well and observation well, or to determine formation fluid movement.

DAS data can be utilized by fiber optic line system 300 to determine fluid allocation in real-time as acoustic noise is generated when fluid flows through casing 312 and in through perforations into the formation. Phase and intensity based interferometric sensing systems are sensitive to temperature and mechanical as well as acoustically induced vibrations. DAS data can be converted from time series date to frequency domain data using Fast Fourier Transforms (FFT) and other transforms like wavelet transforms may also be used to generate different representations of the data. Various frequency ranges can be used for different purposes and where low frequency signal changes may be attributed to formation strain changes or fluid movement and other frequency ranges may be indicative of fluid or gas movement.

Various filtering techniques may be applied by fiber optic line system 300 to generate indicators of events that may be of interest. Indicators may include formation movement due to growing natural fractures, formation stress changes during the fracturing operations (e.g., stress shadowing), fluid seepage during the fracturing operation as formation movement may force fluid into an observation well (which may be detected), fluid flow from fractures, and fluid and proppant flow from fracture hits. Each indicator may have a characteristic signature in terms of frequency content and/or amplitude and/or time dependent behavior, and these indicators may be present at other data types and not limited to DAS data.

DAS systems can also be utilized to detect various seismic events where stress fields and/or growing fracture networks generate microseimic events or where perforation charge events may be used to determine travel time between horizontal wells. This information can be utilized by fiber optic line system 300 from stage to stage to determine changes in travel time as the formation is fractured and filled with fluid and proppant. The DAS systems may also be used with surface seismic sources to generate vertical seismic profiles before, during, and after a fracturing job to determine the effectiveness of the fracturing job as well as determine production effectiveness.

DSS data can be generated by fiber optic line system 300 using various approaches and static strain data can be used to determine absolute strain changes over time. Static strain data can be measured using Brillouin based systems or quasi-distributed strain data from a FBG based system. Static strain may also be used to determine propped fracture volume by reviewing deviations in strain data from a measured strain baseline before fracturing a stage. Fiber optic line system 300 can also determine formation properties such as permeability, poroelastic responses, and leak off rates based on the change of strain versus time and the rate at which the strain changes over time. Dynamic strain data can be utilized by fiber optic line system 300 in real-time to detect fracture growth through an appropriate inversion model, and appropriate actions such as dynamic changes to fluid flow rates in the treatment well, addition of diverters or chemicals into the fracturing fluid, or changes to proppant concentrations or types can then be used to mitigate detrimental effects.

Fiber Bragg Grating based systems may also be utilized for a number of different measurements. For example, FBG's can include partial reflectors that can be used as temperature and strain sensors, or can be used to make various interferometric sensors with very high sensitivity. FBG's can also be utilized to make point sensors or quasi-distributed sensors, where the FBG-based sensors can be used independently or with other types of fiber optic based sensors. FBG's can be manufactured into an optical fiber at a specific wavelength, and other systems such as DAS, DSS, or DTS systems that may operate at different wavelengths in the same fiber and measure different parameters simultaneously as FBG-based systems utilizing Wavelength Division Multiplexing (WDM).

The sensors of fiber optic line system 300 can be positioned in either a treatment well or monitoring wells to measure well communication. The treatment well pressure, rate, proppant concentration, diverters, fluids, and chemicals may be adjusted to change the hydraulic fracturing treatment. These changes may impact the formation responses in several different ways such as: 1) stress fields may change, and this may generate microseismic effects that can be measured with DAS systems and/or single point seismic sensors like geophones; 2) fracture growth rates may change and this can generate changes in measured microseismic events and event distributions over time, or changes in measured strain using the low frequency portion or the DAS signal or Brillouin-based sensing systems; 3) pressure changes due to poroelastic effects may be measured in the monitoring well; 4) pressure data may be measured in the treatment well and correlated to formation responses; and 5) various changes in treatment rates and pressure may generate events that can be correlated to fracture growth rates.

Several measurements can be combined by fiber optic line system 300 to determine adjacent well communication, and this information can be utilized to change hydraulic fracturing treatment schedules to generate desired outcomes.

In some implementations, fiber optic line system 300 can measure and relay real-time positions of fluids, measure cement barrier quality, and/or detect loss circulation locations and their corresponding magnitudes. With the DAS enabled fiber optic line 304 of fiber optic line system 300 in wellbore 316 (e.g., either inside or outside casing 312), fiber optic line system 300 can actuate a wellbore system with controlled "noise" (e.g., from acoustic speaker 306) and then measure the response as a function of the depth. For example, FIG. 3 illustrates wellbore 316 with a DAS enabled fiber optic line 304 that can utilize an acoustic speaker 306 (e.g., a loudspeaker) that can indicate actuation of wellbore 316 at the surface.

The acoustic signal attenuation can be a function of the properties of the medium. For example, the density and compressibility of the medium can play a critical role in the acoustic signal attenuation. Furthermore, the signal may scatter due to the presence of inhomogeneities or an interface that may cause partial/complete reflections. Fiber optic line system 300 may be actuated during cementing operations and/or after the cement has been positioned accordingly.

Cementing operations can also generate acoustic noise while actuating the signal. For example, plugs scrapping on casing 312 and pumping of fluid 310 can both actuate fiber optic line system 300. In some instances, the number of actuators, actuator location, frequency, and the amplitude of the actuation can be controlled and adjusted by fiber optic line system 300. Fiber optic line system 300 can adjust the signal to noise ratio to enhance and enable de-coupling of the signal to distinguish various unknown factors. For example, during cementing operations, fluid identification as well as hole size in a location can be two unknown factors. In some instances, the bore hole remains the same while the fluids can be displaced during cementing operations. This can lead to temporal changes in the signal as one fluid is displaced by the other at a particular location.

In other instances, fiber optic line system 300 can identify loss circulation in wellbore 316. Fiber optic line system 300 can track fluid 310 flow in real time and compare mass/volume balance and/or the loss zone, which may modulate the acoustic signal. In some instances, fiber optic line 304 can also be installed or positioned inside casing/liner 312. Actuation at the surface by fiber optic line system 300 can include pipe ringing and pressure pulsing. Fiber optic line system 300 can also be utilized during reverse cementing operations. In this configuration, fiber optic line system 300 can utilize fluid identification during operations to indicate when cement 314 has turned a corner in casing 312 (e.g., "end-of-job indicator").

In some implementations, fiber optic line system 300 can include tracking hydration of cement 314 in real-time. For example, after setting of cement 314, fiber optic line system 300 can develop equivalent bond logs of the barrier (e.g., cement barrier 314) and monitor its health over time. Furthermore, fiber optic line system 300 can determine fluid position, respective quality, and position of cement 314. Fiber optic line system 300 can further be configured to detect cement barrier quality in real-time. Fiber optic line system 300 can also utilize fiber optic line 304 to determine the location and proximity of spacers 308, completion fluid 310, and cement 314.

Referring to FIG. 3, acoustic speakers 306 can be utilized at the top of wellbore 316 to provide attenuation that can then actuate fiber optic line 304 of fiber optic line system 300. Acoustic speakers 306 can include electro-acoustic transducers, pressure pulses, liquid/slurry rate pulses, step change in slurry compositions, thermal slugs, delayed chemical reaction thermal slugs, or any other source that can interact with the subterranean rock formation and be detected as a signal that propagates throughout the well and that may be detected by fiber optic line system 300. Fiber optic line system 300 can also be an interferometric sensing system (e.g., a Rayleigh-based distributed acoustic sensing system) that can detect thermal events by measuring changes in optical path length. The change in optical path length can be induced by acoustic, strain, and/or thermal events. In other instances, fiber optic line system 300 can include tracers (or chemical components) in the fluid that can provide a contrast to an acoustic signal (e.g., beads popping at a particular pressure) or a thermal signal (e.g., utilizing hematite that can change the thermal properties of the fluid). Fiber optic line 304 can further detect physical actuation of its surroundings throughout and within fiber optic line 304. Acoustic vibration sensors can also be utilized by fiber optic line system 300 and positioned within, on, or outside of casing 312. The acoustic vibration sensors can include a microphone or an accelerometer that can be amplified and that can provide data to fiber optic line system 300 directly or via fiber optic line 304. The sensors can also be two-way communication device sensors that can communicate with fiber optic line 304 and store information measured by the two-way communication device sensor.

In some implementations, fiber optic line system 300 can further include sensors that can measure temperature, pressure, and pH, which can transmit information to fiber optic line 304 either wirelessly or by wire. In other implementations, fiber optic line 304 can measure temperature throughout the subterranean rock formation (e.g., exothermic heat distribution). For example, if cement 314 has not fully cured, fiber optic line 304 will detect a lower temperature and such results provided to fiber optic line system 300.

In some instances, data can be received from fiber optic line 304 when fiber optic line 304 is being installed. For example, as fiber optic line 304 is being installed, fiber optic line system 300 can receive data of the whole field as it is open to monitor acoustic resonances. At the same time, fiber optic line 304 can detect temperature distribution of cement 314.

FIGS. 4A and 4B illustrate an example schematic of a wellbore 401 with a plug-bobbin 404 driven fiber optic line 402 deployed system 400 within an inside casing 408 in accordance with aspects of the present disclosure. Referring to FIG. 4A, fiber optic line system 400 can include a data acquisition system and sensors such as a plug-bobbin 404 fiber optic line 402. Plug-bobbin 404 fiber optic line 402 can include a fiber optic line 402 and a plug-bobbin 404. Fiber optic line 402 can further be any fiber optic line as described herein. Plug-bobbin 404 can also be a cementing plug, a cement block, a dart, or any other device suitable for the intended purpose of driving fiber optic line 402 into wellbore 401 and understood by a person of ordinary skill in the art. Wellbore 401 can include cement 406 and casing/liner 408 similar to wellbore 316 of FIG. 3. Cement 406 can further include cement defects and/or microannulus 410 distributed throughout cement 406. Referring to FIG. 4B, an example graph is illustrated that demonstrates changes to acoustic signal amplitudes 412 at corresponding depths of wellbore 401 that can represent detected cement defects 410. For example, as fiber optic line 402 measures changes to acoustic responses (e.g., deflections or deviations), behavior at various frequencies of acoustic signal amplitudes 412 can be determined by fiber optic line system 400.

In some implementations, fiber optic line system 400 can determine a cement bond log that may be obtained during a cementing operation of a wellbore section similar to the description of FIG. 3. Fiber optic line system 400 can also be executed by cementing personnel at a rig. Fiber optic line system 400 is relatively inexpensive and can provide critical information regarding the quality of the zonal isolation achieved in cementing operations. Fiber optic line system 400 can combine the ability to deploy fiber optic lines 402 in wellbore 401 using cementing plug 404 while being configured to conduct cement bond logs.

In some instances, the outside of casing 408 can be cemented, while the inside of casing 408 can be run-in. Fiber optic line 402 can be a distributed acoustic sending fiber optic line and can be deployed during a cementing operation. While deploying fiber optic line 402, the acoustic signal measured by fiber optic line 402 can be utilized to deduce the competency of zonal isolations on previous casings. For example, at depths below the previous casing shoe, the acoustic signal measured by fiber optic line 402 can be utilized to deduce information of the bore-hole geometry. The amount of wellbore geometry, cement (or any other wellbore fluid), density, defects, presence of mud pockets, temperature, pressure, and casing properties are variables that can affect the acoustic response received by fiber optic line 402.

Fiber optic line system 400 can receive information from fiber optic line 402 and determine factors such as the top of cement 406, quality of cement 406 around casing 408, and any defects such as microannulus or pockets of undisplaced muds 410. For example, during the production of casings or in certain situations where the cement bond log is required for the current casing, fiber optic line system 400 can perform services as described herein for the current cemented casing 408.

In some implementations, fiber optic lines 402 may utilize a plug-bobbin 404 to install fiber optic line 402 in wellbore 401. The construction of plug-bobbin 404 can facilitate driving fiber optic lines 402 into wellbore 401. While fiber optic line 402 is being installed or after fiber optic line 402 is installed in wellbore 401, fiber optic line 402 can then begin taking measurements of its surroundings relating to wellbore geometry, cement (or any other wellbore fluid), density, defects, presence of mud pockets, temperature, pressure, and casing properties are variables that can affect the acoustic response.

Fiber optic line 402 can further include virtual sensors distributed throughout fiber optic line 402 that can be generated synthetically as light is propagated in a controlled manner down fiber optic line 402. Fiber optic line system 400 can further utilize backscattering mechanisms with fiber optic line 402 to measure acoustic responses. Back scattering mechanisms for acoustic sensing can include interferometric Rayleigh back scattering or interferometric systems using point and/or distributed reflectors where variations in the refractive index of the optical fiber may be used to change the amount of light that is reflected along fiber optic line 402. Fiber optic line system 400 can further utilize optical radar techniques like pulsed Optical Time Domain Reflectometry (OTDR) techniques where a pulse is transmitted at a given time and reflections and/or backscattered light is measured over time so that the travel time between the transmitted pulse and backscattered/reflected light can be measured and the location of the events can then be calculated given that the travel time of the pulse in a media like optical fibers is known. For example, the velocity of a pulse is the speed of light divided by the refractive index of an optical fiber where the refractive index is measured during fiber manufacturing. Other techniques like Optical Frequency Domain Reflectometry (OFDR) using a swept tunable laser may also be combined with Rayleigh scattering and/or Fiber Bragg Grating (FBG) technology to measure strain, vibration, thermal events, and/or acoustic events along an optical fiber. Interferometric systems measure changes in optical path length and the optical path length variations may be induced by changes in mechanical strain or vibrations, acoustically induced changes, and/or thermally induced changes. Other back scattering mechanisms like Raman scattering and/or Brillouin scattering may also be used to determine temperature and/or strain induced effects. Various sensing principles can be based on Wavelength Division Multiplexing (WDM) and/or Time Domain Multiplexing (TDM), which may be used in combination with Homodyne and/or Heterodyne interferometric sensing, amplitude and/or wavelength systems, and/or phase measuring systems. With this data, fiber optic line system 400 can determine changes in vibration, sound, and temperature.

In some implementations, plug-bobbin 404 (e.g., a solid object) can be attached to fiber optic line 402 and driving downwards into wellbore 401 by pumping a fluid on top of plug-bobbin 404 for a pumping down regulation time period. In this instance, plug-bobbin 404 can be a projectile that is directed into wellbore 401 and not dragged through the air. Plug-bobbin 404 can also be 95% incompressible and can drag fiber optic line 402 with a slightly higher tension bond to distort peeling off from plug-bobbin 404. For example, plug-bobbin 404 may not drag fiber optic line 402 and cause abrasion. In some instances, as plug-bobbin 404 is being driven down wellbore 401 with fiber optic line 402 attached to plug-bobbin 404 (e.g., as plug-bobbin 404 continues down wellbore 401), measurements can be continuously taken by fiber optic line system 400.

In other implementations, plug-bobbin 404 of fiber optic line system 400 can be first pumped down wellbore 401 to enable a reverse flow cementing process by having a ball seated in plug-bobbin 404 such that the ball seats when pumping through the inside of casing 408, but such that the ball floats or releases to enable fluid to flow when liquid/slurry is pumped through an annular space. This cementing process can provide a cost efficient deployment of fiber optic line system 400 that can be compatible with reverse pumping.

When there are cement defects or microannulus, fiber optic line system 400 can detect such cement defects and microannulus as they will appear as blips 414 (e.g., fluctuation in acoustic signal amplitude) in the measurements that are received by fiber optic line system 400. For example, FIG. 4B illustrates detected behaviors at various frequencies 412. After detecting cement defects or microannulus, fiber optic line system 400 can provide this information to personnel or a third party to inform them to plan accordingly in view of the cement defects or microannulus. The size of the fluctuation in acoustic signal amplitude 414 can indicate the position, size, and shape of the cement defect and microannulus. For example, FIG. 4B illustrates cement defects/microannulus in the shape of a triangle and rectangles. As data is received from fiber optic line 402, fiber optic line 400 can analyze the data, select calibration models accordingly, and adjust parameters in real time. The detection of cement defects and microannulus (e.g., anomalies) may also signal to fiber optic line system 400 or a user that faulty cement is present. In such an instance, fiber optic line system 400 may indicate not to go beyond a certain point (e.g., depth or distance into wellbore 401) because going beyond the point may result in a pressure point that may crack cement 406.

Figure 5:
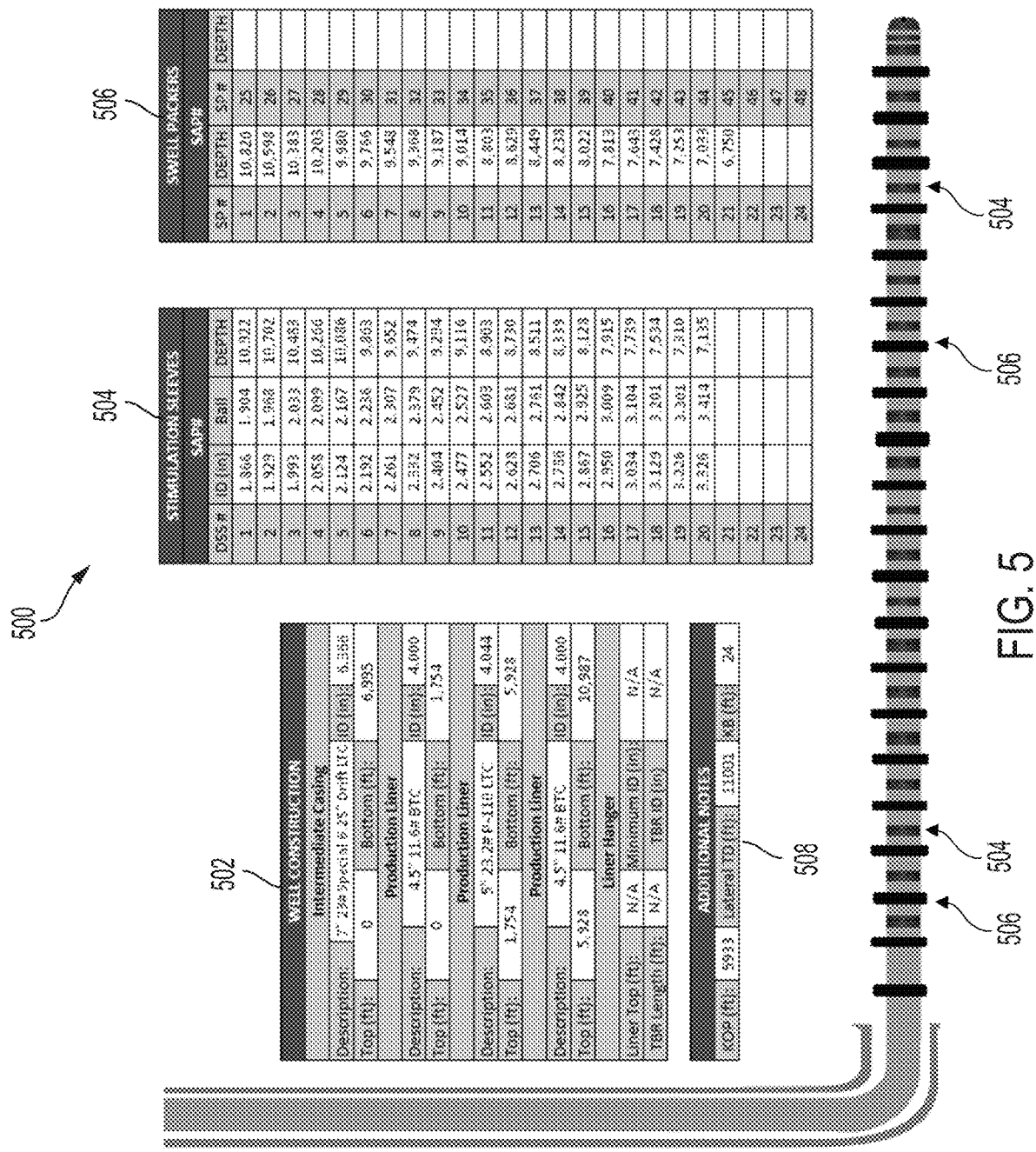
FIG. 5 illustrates an example schematic and tables of a wellbore and corresponding tubular sizes in accordance with aspects of the present disclosure.
Figure 6:
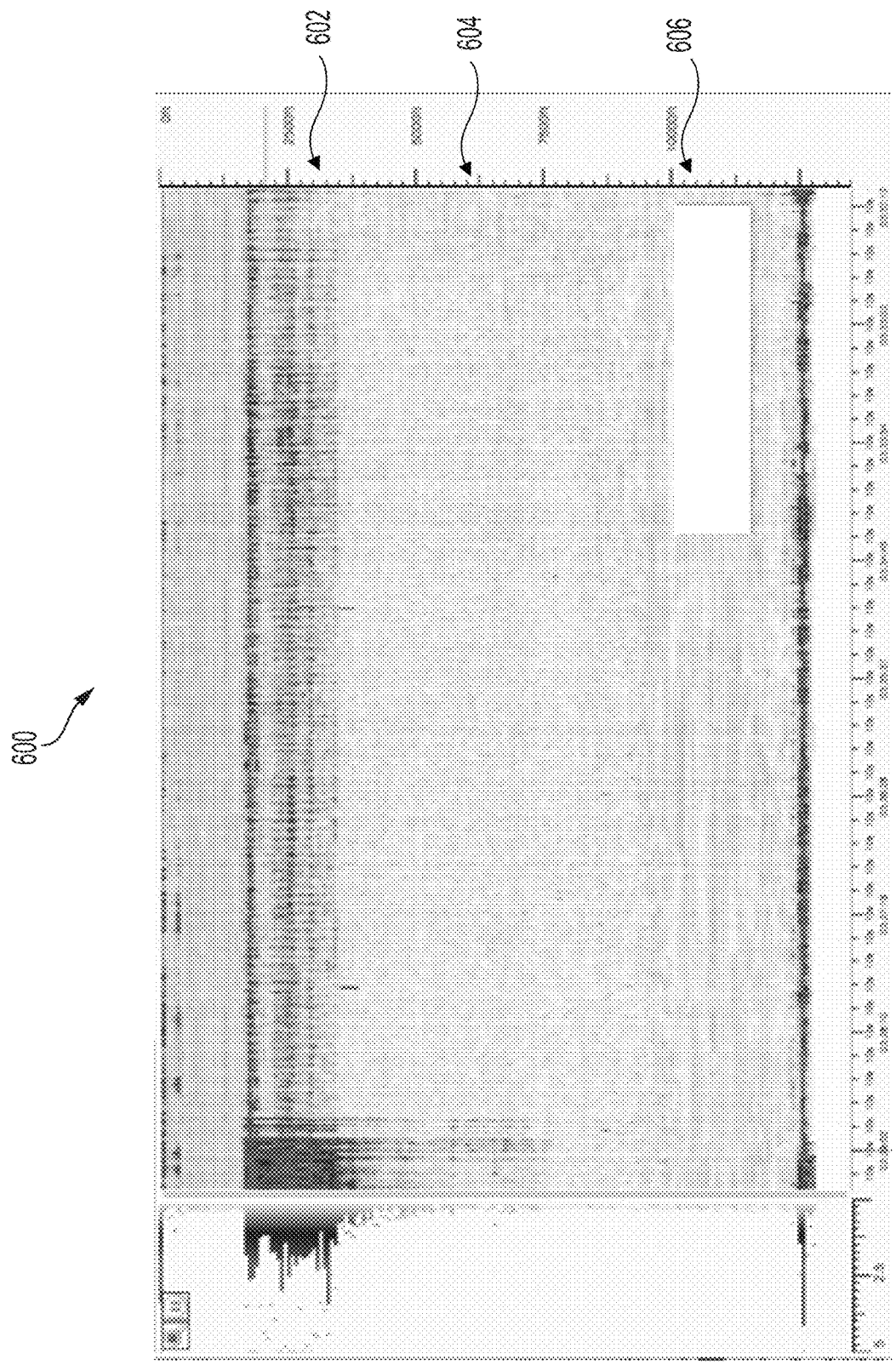
FIG. 6 illustrates an example graph of distributed acoustic sensing fiber optic line responses of a cemented wellbore in accordance with aspects of the present disclosure.

FIG. 5 illustrates an example schematic and tables of a wellbore and corresponding tubular sizes in accordance with aspects of the present disclosure. FIG. 6 illustrates an example graph of distributed acoustic sensing fiber optic line responses of a cemented wellbore in accordance with aspects of the present disclosure.

In some implementations, fiber optic line system 300, 400 can provide continuous information on the health of wellbore 316, 401 compared to a single time information from a cement bond log (CBL). Fiber optic line system 300, 400 can further include: 1) fiber-based technology that does not require a wireline; 2) are relatively inexpensive; 3) providing continuous monitoring on the health of a barrier; and 4) installing a fiber optic line 304, 402 that may have additional benefits in monitoring other wellbore operations.

The DTS, DSS and DAS-enabled fiber optic lines 304, 402 may be installed in wellbore 316, 401 to continuously monitor the health of a wellbore barrier that is deployed. Referring to FIG. 5, an example table 500 is further illustrated that includes information relating to data received from a DAS fiber optic line indicating the presence of a cement barrier in a wellbore. Table 500 includes information such as well construction 502, stimulation sleeves 504, swell packers 506, and additional notes 508. Well construction 502 can include intermediate casing information, production liner information, and liner hanger information. Intermediate casing information can include information relating to descriptions, inner diameter (IN) in inches, top in feet, and bottom in feet. Production liner information can include information relating to descriptions, inner diameter in inches, top in feet, and bottom in feet. Liner hanger information can include liner top in feet, minimum inner diameter in inches, tieback receptacle ("TBR") length in feet, and TBR inner diameter in inches. Stimulation sleeves 504 can include information relating to Systems Applications and Products in Data Processing ("SAP") numbers (SAP numbers can also include part identification numbers), downhole stimulation sleeve (DSS) numbers, inner diameter in inches, ball, and depth. Swell packers 506 can include information relating to SAP numbers, swell packers (SP) numbers and depth. Swell packers 506 can also be mechanical devices that are set to seal against the rock wellbore that has been drilled in. Additional notes 508 can include information relating to Kick Off Point (KOP) in feet, lateral Total Depth (TD) in feet, and Kelly Bushing (KB) in feet.

FIG. 6 further illustrates at the top left origin of the graph a DAS fiber optic line at zero. From the DAS fiber optic line, there is a length of surface fiber cable until reaching the wellhead where a lot of noise is experienced. From the wellhead down (e.g., time at the horizontal axis), the DAS "background noise" is shown. FIG. 6 indicates top of cement 602, cement 604, and no or bottom of cement 606. FIG. 6 also includes time along the horizontal X-axis and depth in feet along the vertical Y-axis.

In some implementations, fiber optic line system 300, 400 can utilize background noise detected by fiber optic line 304, 402 that can be deployed along the outside of casing 312, 408. Once cement 314, 406 has cured, fluid can flow down the center of wellbore 316, 401, thereby generating turbulent flow and noise. Fiber optic line system 300, 400 can analyze active noise simulated from above pulses (e.g., with acoustic speakers 306 of FIG. 3) that can propagate/send energy out into the formation and wellbore 316, 401. With the background noise detected by fiber optic line 304, 402, fiber optic line system 300, 400 can determine acoustic appliances, acoustic impedances, type of sets, pin, and box, as well as where cement is or is not (e.g., cement position). For example, fiber optic line system 300, 400 can detect different materials based on impedance matching since cement has different properties when compared to steel, well rock, gas, or water. Fiber optic line system 300, 400 can further utilize detected background noise to detect changes in intensity, frequency, hydration levels, type of resonance (e.g., underdamped or damped), or a damping factor. These factors can be measured in real-time and continuously to determine a progression or change in each factor. For example, hydration levels of cement 314, 406 can be continuously measured by fiber optic line system 300, 400 to determine the state (e.g., cured or uncured) of cement 314, 406 by utilizing fiber optic line 304, 402. Regarding sound reflection, reflected sound energies and reflectance can have impedances that are mismatched. For example, if there is an air pocket, the air pocket will have a large impedance mismatch when compared to liquids and solids.

Stimulation sleeves 504 can be mechanical devices that can be directed to open up initially at the end of wellbore 316, 401. Thereafter, a process can occur of plugging each stimulation sleeve 504 to isolate zones with corresponding swell packers 506. Stimulation sleeves 504 can also be ports that allow fluids to come in through slots (e.g., perforations) in production liner 312, 408. A set of cartridges of balls can also be utilized by fiber optic line system 300, 400 to stop/block designated zones of wellbore 316, 401. For example, different sized balls can be sent down wellbore 316, 401 to stop/block designated zones. In some instances, the smallest ball (e.g., 1.904 inches) is initially sent down wellbore 316, 401. Thereafter, the next larger sized ball (e.g., larger diameter) is sent down wellbore 316, 401 to being sent down wellbore 316, 401 stop/block designated zones. This process can continue until all zones are closed and all stimulation sleeves 504 have been blocked.

Figure 7:
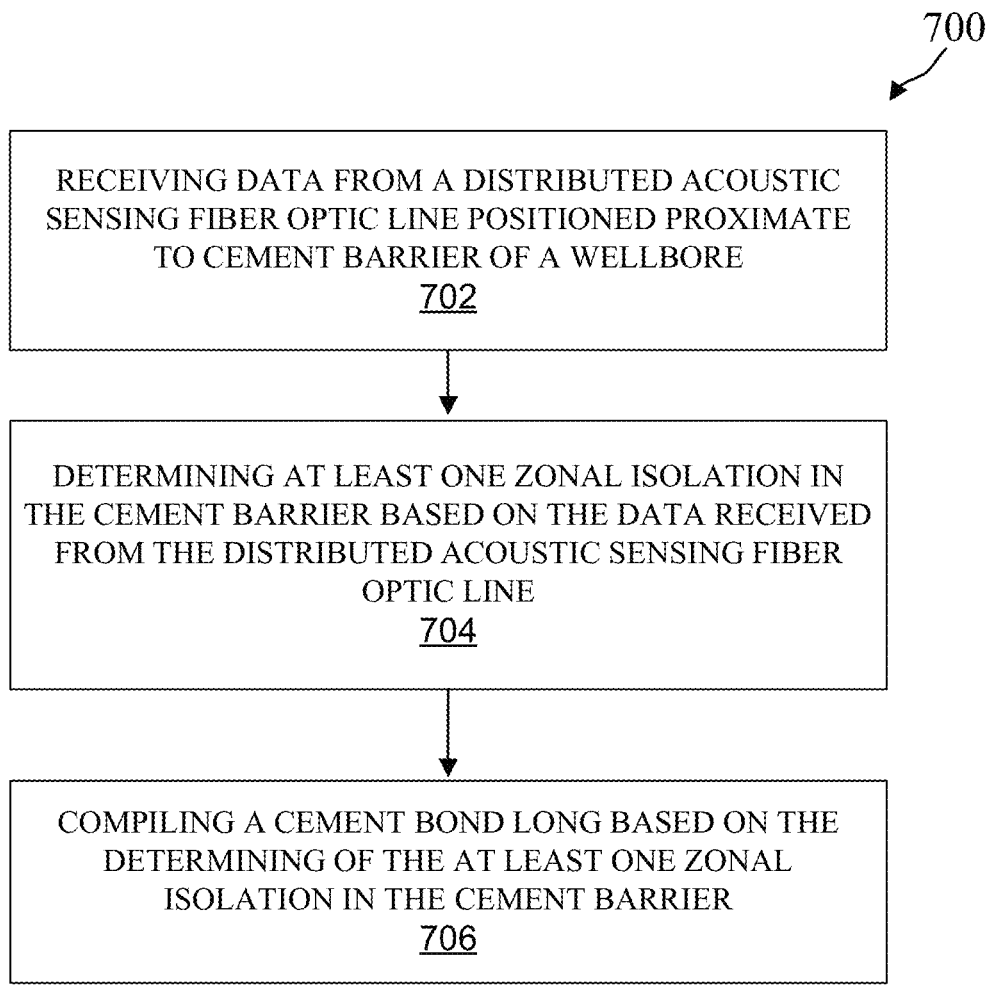
FIG. 7 shows an example process for determining cement barrier quality in accordance with aspects of the present disclosure.

Having disclosed some example system components and concepts, the disclosure now turns to FIG. 7, which illustrate example method 700 for determining cement barrier quality of a cementing process. The steps outlined herein are exemplary and can be implemented in any combination thereof, including combinations that exclude, add, or modify certain steps.

At step 702, the method 700 can include receiving data from a distributed acoustic sensing fiber optic line positioned proximate to cement barrier of a wellbore. In some instances, the data from the distributed acoustic sensing fiber optic line can include acoustic signal attenuation data of the cement barrier. In other instances, the distributed acoustic sensing fiber optic line can be positioned on an exterior surface of a casing that lines the wellbore. The distributed acoustic sensing fiber optic line can also be configured to provide data relating to at least one of strain, temperature, and pressure.

At step 704, the method 700 can include determining at least one zonal isolation in the cement barrier based on the data received from the distributed acoustic sensing fiber optic line. In some instances, the at least one zonal isolation in the cement barrier can be a cement defect or a microannulus.

At step 706, the method 700 can include compiling a cement bond log based on the determining of the at least one zonal isolation in the cement barrier.

In other implementations, method 700 can further include determining a geometry of the at least one zonal isolation in the cement barrier based on the data received from the distributed acoustic sensing fiber optic line.

Method 700 can also include determining a hydration level of the cement barrier in real time based on the data received from the distributed acoustic sensing fiber optic line.

Figure 8:
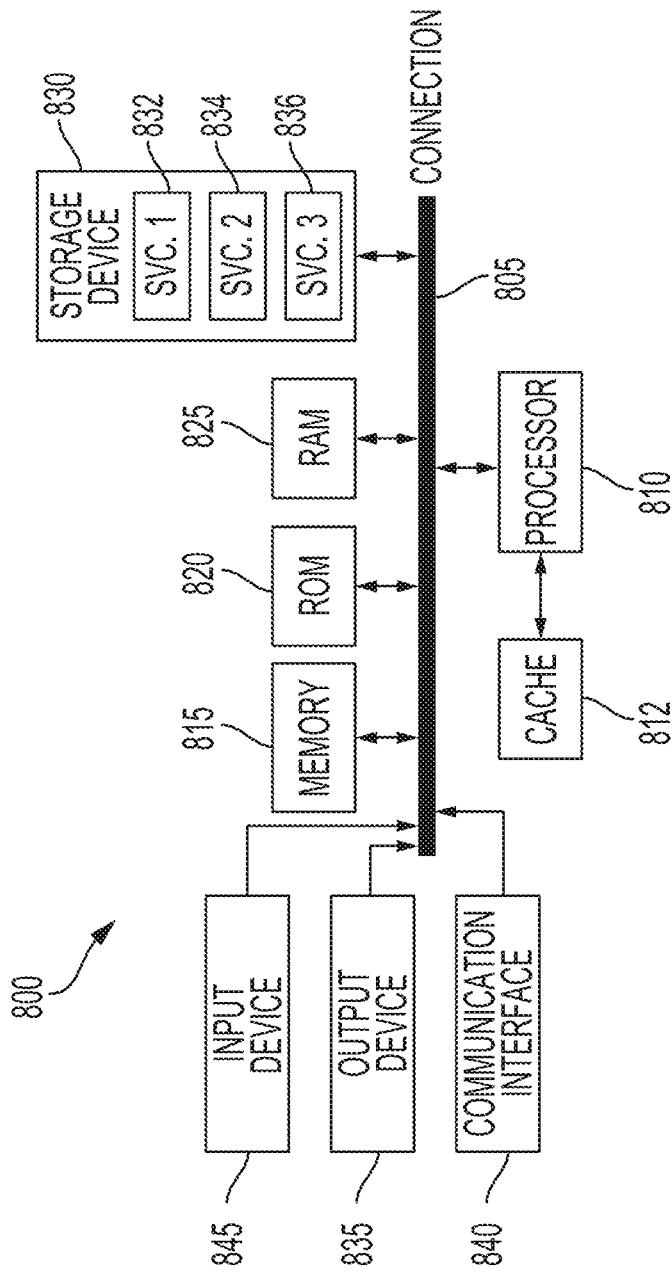
FIG. 8 shows an example computing device architecture which can be employed to perform various steps, methods, and techniques disclosed herein.

FIG. 8 illustrates an example computing device architecture 800 which can be employed to perform various steps, methods, and techniques disclosed herein. The various implementations will be apparent to those of ordinary skill in the art when practicing the present technology. Persons of ordinary skill in the art will also readily appreciate that other system implementations or examples are possible.

As noted above, FIG. 8 illustrates an example computing device architecture 800 of a computing device which can implement the various technologies and techniques described herein. The components of the computing device architecture 800 are shown in electrical communication with each other using a connection 805, such as a bus. The example computing device architecture 800 includes a processing unit (CPU or processor) 810 and a computing device connection 805 that couples various computing device components including the computing device memory 815, such as read only memory (ROM) 820 and random access memory (RAM) 825, to the processor 810.

The computing device architecture 800 can include a cache of high-speed memory connected directly with, in close proximity to, or integrated as part of the processor 810. The computing device architecture 800 can copy data from the memory 815 and/or the storage device 830 to the cache 812 for quick access by the processor 810. In this way, the cache can provide a performance boost that avoids processor 810 delays while waiting for data. These and other modules can control or be configured to control the processor 810 to perform various actions. Other computing device memory 815 may be available for use as well. The memory 815 can include multiple different types of memory with different performance characteristics. The processor 810 can include any general purpose processor and a hardware or software service, such as service 1 832, service 2 834, and service 3 836 stored in storage device 830, configured to control the processor 810 as well as a special-purpose processor where software instructions are incorporated into the processor design. The processor 810 may be a self-contained system, containing multiple cores or processors, a bus, memory controller, cache, etc. A multi-core processor may be symmetric or asymmetric.

To enable user interaction with the computing device architecture 800, an input device 845 can represent any number of input mechanisms, such as a microphone for speech, a touch-sensitive screen for gesture or grail input, keyboard, mouse, motion input, speech and so forth. An output device 835 can also be one or more of a number of output mechanisms known to those of skill in the art, such as a display, projector, television, speaker device, etc. In some instances, multimodal computing devices can enable a user to provide multiple types of input to communicate with the computing device architecture 800. The communications interface 840 can generally govern and manage the user input and computing device output. There is no restriction on operating on any particular hardware arrangement and therefore the basic features here may easily be substituted for improved hardware or firmware arrangements as they are developed.

Storage device 830 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 825, read only memory (ROM) 820, and hybrids thereof. The storage device 830 can include services 832, 834, 836 for controlling the processor 810. Other hardware or software modules are contemplated. The storage device 830 can be connected to the computing device connection 805. In one aspect, a hardware module that performs a particular function can include the software component stored in a computer-readable medium in connection with the necessary hardware components, such as the processor 810, connection 805, output device 835, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can include hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the disclosed concepts may be otherwise variously embodied and employed, and that the appended claims are intended to be construed to include such variations, except as limited by the prior art. Various features and aspects of the above-described subject matter may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the method, algorithms, and/or operations described above. The computer-readable data storage medium may form part of a computer program product, which may include packaging materials.

The computer-readable medium may include memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

In the above description, terms such as "upper," "upward," "lower," "downward," "above," "below," "downhole," "uphole," "longitudinal," "lateral," and the like, as used herein, shall mean in relation to the bottom or furthest extent of the surrounding wellbore even though the wellbore or portions of it may be deviated or horizontal. Correspondingly, the transverse, axial, lateral, longitudinal, radial, etc., orientations shall mean orientations relative to the orientation of the wellbore or tool. Additionally, the illustrate embodiments are illustrated such that the orientation is such that the right-hand side is downhole compared to the left-hand side.

The term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "inside" indicates that at least a portion of a region is partially contained within a boundary formed by the object. The term "substantially" is defined to be essentially conforming to the particular dimension, shape or another word that substantially modifies, such that the component need not be exact. For example, substantially cylindrical means that the object resembles a cylinder, but can have one or more deviations from a true cylinder.

The term "radially" means substantially in a direction along a radius of the object, or having a directional component in a direction along a radius of the object, even if the object is not exactly circular or cylindrical. The term "axially" means substantially along a direction of the axis of the object. If not specified, the term axially is such that it refers to the longer axis of the object.

Although a variety of information was used to explain aspects within the scope of the appended claims, no limitation of the claims should be implied based on particular features or arrangements, as one of ordinary skill would be able to derive a wide variety of implementations. Further and although some subject matter may have been described in language specific to structural features and/or method steps, it is to be understood that the subject matter defined in the appended claims is not necessarily limited to these described features or acts. Such functionality can be distributed differently or performed in components other than those identified herein. The described features and steps are disclosed as possible components of systems and methods within the scope of the appended claims.

Moreover, claim language reciting "at least one of" a set indicates that one member of the set or multiple members of the set satisfy the claim. For example, claim language reciting "at least one of A and B" means A, B, or A and B.

Statements of the disclosure include:

Statement 1: A method comprising: receiving data from a distributed acoustic sensing fiber optic line positioned proximate to cement barrier of a wellbore, determining at least one zonal isolation in the cement barrier based on the data received from the distributed acoustic sensing fiber optic line, and compiling a cement bond log based on the determining of the at least one zonal isolation in the cement barrier.

Statement 2: A method according to Statement 1, wherein the data from the distributed acoustic sensing fiber optic line includes acoustic signal attenuation data of the cement barrier.

Statement 3: A method according to any of Statements 1 and 2, wherein the distributed acoustic sensing fiber optic line is positioned on an exterior surface of a casing that lines the wellbore.

Statement 4: A method according to any of Statements 1 through 3, wherein the distributed acoustic sensing fiber optic line is configured to provide data relating to at least one of strain, temperature, and pressure.

Statement 5: A method according to any of Statements 1 through 4, wherein the at least one zonal isolation in the cement barrier is a cement defect or a microannulus.

Statement 6: A method according to any of Statements 1 through 5, further comprising determining a geometry of the at least one zonal isolation in the cement barrier based on the data received from the distributed acoustic sensing fiber optic line.

Statement 7: A method according to any of Statements 1 through 6, further comprising determining a hydration level of the cement barrier in real time based on the data received from the distributed acoustic sensing fiber optic line.

Statement 8: A system comprising: one or more processors; and at least one computer-readable storage medium having stored therein instructions which, when executed by the one or more processors, cause the system to: receive data from a distributed acoustic sensing fiber optic line positioned proximate to cement barrier of a wellbore; determine at least one zonal isolation in the cement barrier based on the data received from the distributed acoustic sensing fiber optic line; and compile a cement bond log based on the determination of the at least one zonal isolation in the cement barrier.

Statement 9: A system according to Statement 8, wherein the data from the distributed acoustic sensing fiber optic line includes acoustic signal attenuation data of the cement barrier.

Statement 10: A system according to any of Statements 8 and 9, wherein the distributed acoustic sensing fiber optic line is positioned on an exterior surface of a casing that lines the wellbore.

Statement 11: A system according to any of Statements 8 through 10, wherein the distributed acoustic sensing fiber optic line is configured to provide data relating to at least one of strain, temperature, and pressure.

Statement 12: A system according to any of Statements 8 through 11, wherein the at least one zonal isolation in the cement barrier is a cement defect or a microannulus.

Statement 13: A system according to any of Statements 8 through 12, wherein the instructions which, when executed by the one or more processors, cause the system to determine a geometry of the at least one zonal isolation in the cement barrier based on the data received from the distributed acoustic sensing fiber optic line.

Statement 14: A system according to any of Statements 8 through 13, wherein the instructions which, when executed by the one or more processors, cause the system to determine a hydration level of the cement barrier in real time based on the data received from the distributed acoustic sensing fiber optic line.

Statement 15: A non-transitory computer-readable storage medium comprising: instructions stored on the non-transitory computer-readable storage medium, the instructions, when executed by one or more processors, cause the one or more processors to: receive data from a distributed acoustic sensing fiber optic line positioned proximate to cement barrier of a wellbore; determine at least one zonal isolation in the cement barrier based on the data received from the distributed acoustic sensing fiber optic line; and compile a cement bond log based on the determination of the at least one zonal isolation in the cement barrier.

Statement 16: A non-transitory computer-readable storage medium according to Statement 15, wherein the data from the distributed acoustic sensing fiber optic line includes acoustic signal attenuation data of the cement barrier.

Statement 17: A non-transitory computer-readable storage medium according to any of Statements 15 and 16, wherein the distributed acoustic sensing fiber optic line is positioned on an exterior surface of a casing that lines the wellbore.

Statement 18: A non-transitory computer-readable storage medium according to any of Statements 15 through 17, wherein the distributed acoustic sensing fiber optic line is configured to provide data relating to at least one of strain, temperature, and pressure.

Statement 19: A non-transitory computer-readable storage medium according to any of Statements 15 through 18, wherein the at least one zonal isolation in the cement barrier is a cement defect or a microannulus.

Statement 20: A non-transitory computer-readable storage medium according to any of Statements 15 through 19, wherein the instructions, when executed by the one or more processors, cause the one or more processors to determine a geometry of the at least one zonal isolation in the cement barrier based on the data received from the distributed acoustic sensing fiber optic line.

What is claimed is:

1. A method for determining a cement barrier quality of a wellbore, the method comprising:
   transmitting acoustic energy from an energy source, wherein at least a portion of the acoustic energy transmitted from the energy source propagates along the wellbore when a hydration level of the wellbore is monitored;
   receiving data from a distributed acoustic sensing fiber optic line that senses the portion of the transmitted energy based on the distributed acoustic sensing fiber optic line being positioned proximate to the cement barrier of the wellbore when the hydration level of the cement barrier is monitored;
   identifying that a current state of the cement barrier corresponds to a cured state based on the monitoring of the hydration level of the cement barrier, wherein the cement barrier forms a sheath that supports a casing within the wellbore when the state of the cement barrier corresponds to the cured state;
   performing an analysis on the data received from the distributed acoustic sensing fiber optic line;
   identifying at least one zonal isolation in the cement barrier based on the analysis of the data received from the distributed acoustic sensing fiber optic line identifying a fluctuation in an acoustic signal amplitude;

associating the fluctuation in the acoustic signal amplitude with the zonal isolation;

storing data in a cement bond log after associating the fluctuation in the acoustic signal amplitude with the zonal isolation; and determining the cement barrier quality based on the stored cement bond log data as the sheath supports the casing within the wellbore.

2. The method of claim 1, wherein the data from the distributed acoustic sensing fiber optic line includes acoustic signal attenuation data of the cement barrier and wherein the analysis also identifies that the fluctuation in acoustic signal amplitude occurs at a plurality of different frequencies.

3. The method of claim 1, wherein the distributed acoustic sensing fiber optic line is positioned on an exterior surface of a casing that lines the wellbore.

4. The method of claim 1, wherein the distributed acoustic sensing fiber optic line is configured to provide data relating to at least one of strain, temperature, and pressure.

5. The method of claim 1, wherein the at least one zonal isolation in the cement barrier is a cement defect or a microannulus.

6. The method of claim 1, further comprising determining a geometry of the at least one zonal isolation in the cement barrier based on the data received from the distributed acoustic sensing fiber optic line.

7. The method of claim 1, further comprising determining a hydration level of the cement barrier in real time based on the data received from the distributed acoustic sensing fiber optic line to identify the state of the cement barrier, wherein the state of the cement barrier corresponds to at least one of an uncured state or the cured state.

8. A system for determining a cement barrier quality of a wellbore, the system comprising:

one or more processors; and at least one computer-readable storage medium having stored therein instructions which, when executed by the one or more processors, cause the system to:

transmit acoustic energy from an energy source, wherein at least a portion of the acoustic energy transmitted from the energy source propagates along the wellbore when a hydration level of the wellbore is monitored;

receive data from a distributed acoustic sensing fiber optic line that senses the portion of the transmitted energy based on the distributed acoustic sensing fiber optic line being positioned proximate to the cement barrier of the wellbore when the hydration level of the cement barrier is monitored;

identify that a current state of the cement barrier corresponds to a cured state based on the monitoring of the hydration level of the cement barrier, wherein the cement barrier forms a sheath that supports a casing within the wellbore when the state of the cement barrier corresponding to the cured state;

perform an analysis on the data received from the distributed acoustic sensing fiber optic line;

identify at least one zonal isolation in the cement barrier based on the analysis of the data received from the distributed acoustic sensing fiber optic line identifying a fluctuation in an acoustic signal amplitude;

associate the fluctuation in the acoustic signal amplitude with the zonal isolation;

store data in a cement bond log after associating the fluctuation in the acoustic signal amplitude with the zonal isolation; and determine the cement barrier quality based on the stored cement bond log data as the sheath supports the casing within the wellbore.

9. The system of claim 8, wherein the data from the distributed acoustic sensing fiber optic line includes acoustic signal attenuation data of the cement barrier.

10. The system of claim 8, wherein the distributed acoustic sensing fiber optic line is positioned on an exterior surface of a casing that lines the wellbore.

11. The system of claim 8, wherein the distributed acoustic sensing fiber optic line is configured to provide data relating to at least one of strain, temperature, and pressure.

12. The system of claim 8, wherein the at least one zonal isolation in the cement barrier is a cement defect or a microannulus.

13. The system of claim 8, wherein the instructions which, when executed by the one or more processors, cause the system to determine a geometry of the at least one zonal isolation in the cement barrier based on the data received from the distributed acoustic sensing fiber optic line.

14. The system of claim 8, wherein the instructions which, when executed by the one or more processors, cause the system to determine a hydration level of the cement barrier in real time based on the data received from the distributed acoustic sensing fiber optic line.

15. A non-transitory computer-readable storage medium comprising:

instructions stored on the non-transitory computer-readable storage medium for determining a cement barrier quality of a wellbore, the instructions, when executed by one or more processors, cause the one or more processors to:

transmit acoustic energy from an energy source, wherein at least a portion of the acoustic energy transmitted from the energy source propagates along the wellbore when a hydration level of the wellbore is monitored;

receive data from a distributed acoustic sensing fiber optic line that senses the portion of the transmitted energy based on the distributed acoustic sensing fiber optic line being positioned proximate to cement barrier of the wellbore when the hydration level of the cement barrier is monitored;

identify that a current state of the cement barrier corresponds to a cured state based on monitoring the hydration level of the cement barrier, wherein the cement barrier forms a sheath that supports a casing within the wellbore when the state of the cement barrier corresponds to the cured state;

perform an analysis on the data received from the distributed acoustic sensing fiber optic line;

identify at least one zonal isolation in the cement barrier based on the analysis of the data received from the distributed acoustic sensing fiber optic line identifying a fluctuation in an acoustic signal amplitude;

associate the fluctuation in the acoustic signal amplitude with the zonal isolation;

store data in a cement bond log after associating the fluctuation in the acoustic signal amplitude with the zonal isolation; and determine the cement barrier quality based on the stored cement bond log data as the sheath supports the casing within the wellbore.

16. The non-transitory computer-readable storage medium of claim 15, wherein the data from the distributed acoustic sensing fiber optic line includes acoustic signal attenuation data of the cement barrier.

17. The non-transitory computer-readable storage medium of claim 15, wherein the distributed acoustic sensing fiber optic line is positioned on an exterior surface of a casing that lines the wellbore.

18. The non-transitory computer-readable storage medium of claim 15, wherein the distributed acoustic sensing fiber optic line is configured to provide data relating to at least one of strain, temperature, and pressure.

19. The non-transitory computer-readable storage medium of claim 15, wherein the at least one zonal isolation in the cement barrier is a cement defect or a microannulus.

20. The non-transitory computer-readable storage medium of claim 15, wherein the instructions, when executed by the one or more processors, cause the one or more processors to determine a geometry of the at least one zonal isolation in the cement barrier based on the data received from the distributed acoustic sensing fiber optic line.

\* \* \* \* \*